(12) United States Patent
Carlson et al.

(10) Patent No.: US 9,774,527 B2
(45) Date of Patent: Sep. 26, 2017

(54) RESILIENT PEER-TO-PEER APPLICATION MESSAGE ROUTING

(75) Inventors: Björn Carlson, Stockholm (SE); Robert Adolfsson, Vega (SE)

(73) Assignee: Nasdaq Technology AB, Stockholm (SE)

( * ) Notice: Subject to any disclaimer, the term of this patent is extended or adjusted under 35 U.S.C. 154(b) by 334 days.

(21) Appl. No.: 13/600,537

(22) Filed: Aug. 31, 2012

(65) Prior Publication Data

US 2014/0064279 A1    Mar. 6, 2014

(51) Int. Cl.
*H04L 12/28* (2006.01)
*H04L 12/741* (2013.01)
(Continued)

(52) U.S. Cl.
CPC ............ *H04L 45/74* (2013.01); *H04L 45/021* (2013.01); *H04L 45/28* (2013.01); *H04L 45/306* (2013.01);
(Continued)

(58) Field of Classification Search
CPC ...... H04L 12/701; H04L 12/757; H04L 45/74
(Continued)

(56) References Cited

U.S. PATENT DOCUMENTS

| 6,567,380 | B1 * | 5/2003 | Chen | ................... | H04L 45/02 370/238 |
| 6,850,980 | B1 * | 2/2005 | Gourlay | ............... | H04L 67/327 370/249 |

(Continued)

FOREIGN PATENT DOCUMENTS

| EP | 1 229 442 | 8/2002 |
| EP | 1578071 | 9/2005 |

(Continued)

OTHER PUBLICATIONS

S. Muralidharan et al., "Galaxia: A Semi-Decentralized System for Implementing Secure-Group P2P Networks", Proceedings of the International Conference on Networks & Communications, pp. 289-294, Dec. 2009.

(Continued)

*Primary Examiner* — Khaled Kassim
*Assistant Examiner* — Berhanu Belete
(74) *Attorney, Agent, or Firm* — Nixon & Vanderhye P.C.

(57) ABSTRACT

Example embodiments relate to a method of, and device for facilitating, resilient peer-to-peer application message routing. The method comprises storing a network routing table comprising destination addresses of applications hosted on peer nodes of a network, and providing the peer nodes with a copy of the routing table via which routing table an application message from any one of the peer nodes is routed to a destination address designating a destination application hosted by a destination peer node. Further, the method comprises providing, when the destination application hosted by the destination peer node is inactivated, all peer nodes with a copy of an updated routing table taking into account the inactivation of said application, wherein a further application message addressed from any one of the peer nodes to the destination address associated with the inactivated application is routed via the updated routing table, to an alternative destination application having the same destination address as the inactivated application.

12 Claims, 6 Drawing Sheets

(51) Int. Cl.
*H04L 12/755* (2013.01)
*H04L 12/725* (2013.01)
*H04L 12/703* (2013.01)
*H04L 29/08* (2006.01)
*H04L 29/14* (2006.01)

(52) U.S. Cl.
CPC .......... *H04L 45/54* (2013.01); *H04L 67/1074* (2013.01); *H04L 67/1076* (2013.01); *H04L 67/1093* (2013.01); *H04L 67/327* (2013.01); *H04L 69/40* (2013.01)

(58) Field of Classification Search
USPC .......... 370/392, 789; 709/204, 220–229, 230, 709/238
See application file for complete search history.

(56) References Cited

U.S. PATENT DOCUMENTS

| | | | | |
|---|---|---|---|---|
| 6,976,087 | B1* | 12/2005 | Westfall | H04L 12/5695 370/238 |
| 7,120,697 | B2* | 10/2006 | Aiken, Jr. | H04L 29/06 709/226 |
| 7,136,927 | B2* | 11/2006 | Traversat | G06F 9/4416 709/225 |
| 7,227,872 | B1* | 6/2007 | Biswas | H04L 29/12367 370/465 |
| 7,406,034 | B1* | 7/2008 | Cometto | H04L 45/02 370/218 |
| 7,551,552 | B2* | 6/2009 | Dunagan et al. | 370/221 |
| 7,685,459 | B1* | 3/2010 | De Spiegeleer | G06F 11/1453 714/6.12 |
| 7,689,764 | B1* | 3/2010 | De Spiegeleer | G06F 11/1464 711/108 |
| 9,210,067 | B1* | 12/2015 | Agarwal | H04L 45/02 |
| 2002/0147810 | A1 | 10/2002 | Traversat et al. | |
| 2004/0034716 | A1* | 2/2004 | Sundarraj | H04L 67/34 709/242 |
| 2004/0044790 | A1* | 3/2004 | Loach | G06F 17/30106 709/241 |
| 2004/0162871 | A1* | 8/2004 | Pabla | H04W 8/005 709/201 |
| 2004/0249970 | A1* | 12/2004 | Castro | H04L 29/12009 709/238 |
| 2005/0078660 | A1* | 4/2005 | Wood | H04L 12/5692 370/352 |
| 2005/0083834 | A1* | 4/2005 | Dunagan | G06F 11/0709 370/221 |
| 2006/0005231 | A1* | 1/2006 | Zuk | H04L 29/06 726/3 |
| 2006/0047742 | A1* | 3/2006 | O'Neill | H04L 49/25 709/203 |
| 2006/0146999 | A1* | 7/2006 | Thompson | G06F 9/542 379/88.18 |
| 2006/0168070 | A1* | 7/2006 | Thompson | G06F 9/542 709/206 |
| 2007/0027896 | A1* | 2/2007 | Newport | H04L 67/14 |
| 2007/0028293 | A1* | 2/2007 | Boerries | H04L 67/327 726/2 |
| 2007/0038703 | A1* | 2/2007 | Tendjoukian | H04L 69/08 709/206 |
| 2007/0064702 | A1* | 3/2007 | Bates et al. | 370/392 |
| 2007/0192326 | A1* | 8/2007 | Angal | G06F 11/1482 |
| 2007/0237089 | A1* | 10/2007 | Chen | H04L 12/437 370/252 |
| 2008/0313279 | A1* | 12/2008 | Strauss et al. | 709/204 |
| 2009/0287955 | A1* | 11/2009 | Matsumoto | H04L 12/4633 714/4.1 |
| 2010/0121980 | A1* | 5/2010 | Hoeflin | H04L 69/40 709/244 |
| 2010/0254255 | A1* | 10/2010 | Devarapalli | G06F 15/16 370/216 |
| 2010/0281163 | A1 | 11/2010 | Shi et al. | |
| 2011/0010560 | A1* | 1/2011 | Etchegoyen | G06F 11/2025 713/189 |
| 2011/0047413 | A1* | 2/2011 | McGill | G06F 11/1662 714/15 |
| 2011/0145376 | A1* | 6/2011 | Bates | H04L 45/02 709/221 |
| 2012/0284794 | A1* | 11/2012 | Trent et al. | 726/23 |
| 2013/0185451 | A1* | 7/2013 | Gelter | H04L 47/74 709/231 |

FOREIGN PATENT DOCUMENTS

| | | |
|---|---|---|
| EP | 2007103 | 12/2008 |
| EP | 2230802 | 9/2010 |

OTHER PUBLICATIONS

International Search Report mailed Feb. 19, 2014 in International Application No. PCT/SE2013/050703, 4 pages.
Written Opinion of the International Searching Authority mailed Feb. 19, 2014 in International Application No. PCT/SE2013/050703, 10 pages.
Australian Examination Report dated Jul. 15, 2015 in AU 2013309531, 3 pages.
Extended European Search Report issued May 24, 2016 in EP 13833932.0, 10 pages.

\* cited by examiner

RESILIENT PEER-TO-PEER APPLICATION MESSAGE ROUTING

TECHNICAL FIELD

The invention relates to a method of, and device for facilitating, resilient peer-to-peer application message routing.

BACKGROUND

Existing market surveillance and transaction systems provide approaches to monitor and control securities markets. Typically, the market transaction systems provide a comprehensive real-time database of trading activity as well as a structure to analyse and process transaction data.

In the art, a Reliable Transaction Router (RTR) is used in a transaction system as a middleware product that guarantees safe inter-process communication. Messages between processes are sent as RTR transactions.

The existing RTR has drawbacks, for example the relative slowness of the system. There is thus a need to provide an alternative to the existing RTR used in prior art transaction systems.

SUMMARY

An object of embodiments of present invention is to provide an improved method, device and system of routing nodes in a network.

This is attained in a first aspect of embodiments of the present invention by a method of performing resilient peer-to-peer application message routing. The method comprises storing a network routing table comprising destination addresses of applications hosted on peer nodes of a network, and providing the peer nodes with a copy of the routing table via which routing table an application message from any one of the peer nodes is routed to a destination address designating a destination application hosted by a destination peer node. Further, the method comprises providing, when the destination application hosted by the destination peer node is inactivated, all peer nodes with a copy of an updated routing table taking into account the inactivation of said application, wherein a further application message addressed from any one of the peer nodes to the destination address associated with the inactivated application is routed (S106), via the updated routing table, to an alternative destination application having the same destination address as the inactivated application.

This object is attained in a second aspect of the present invention by a device for facilitating resilient peer-to-peer application message routing. The device comprises a processing unit and a storage medium, wherein the storage medium is arranged to store a network routing table comprising destination addresses of applications hosted on peer nodes of a network. Further, the processing unit is arranged to provide the peer nodes with a copy of the routing table via which routing table an application message from any one of the peer nodes is routed to a destination address designating a destination application of a destination peer node, and to provide, when the destination application hosted by the destination peer node is inactivated, all peer nodes with a copy of an updated routing table taking into account the inactivation of said application, wherein a further application message addressed from any one of the peer nodes to the destination address associated with the inactivated application is routed, via the updated routing table, to an alternative destination application having the same destination address as the inactivated application.

Thus, according to an embodiment of the present invention, a device having computing and data storing capabilities, such as a server, registers peer nodes entering a network. This device will in the following be referred to as a tracker. A peer node connecting to the network may e.g. be embodied in the form of a computer client requesting access to a particular destination node running an application which the computer client wishes to execute. This is particularly advantageous for query processing, where an application running on a peer node of the network has the need to send an inquiry to a destination application running on another peer node and require a fast response to the inquiry. The node entering the network establishes a connection to the tracker e.g. via the Internet. The tracker stores a network routing table listing routes, i.e. addresses, to applications hosted on various network peer nodes. Thus, upon registration of a peer node entering the network, the tracker advantageously provides the entering peer node with a copy of the routing table via which an application message from the entering network peer node subsequently is routed to a destination address designating a destination application hosted by a destination peer node By having the network peer nodes locally store a replicated routing table, access time to destination peer nodes hosting required applications can be dramatically reduced since the destination application of a destination peer node does not have to be accessed via the tracker, but can be directly addressed via the locally stored copy of the routing table. Further, once an application residing on any one of the network peer nodes is inactivated, due to e.g. a software crash, a temporary modification of the application, if the peer node on which the application exits the network, etc., the tracker provides the peer nodes with a copy of an updated routing table taking into account that the application has been inactivated. The application entry could either be cancelled altogether from the routing table, i.e. the entry associated with the application is nullified, or the entry remains in the table with an indication that it no longer is valid. A further application message addressed from any one of the peer nodes to the destination address associated with the inactivated application is routed, via the updated and locally stored routing table, to an alternative destination application having the same destination address as the inactivated application. The alternative destination application could either be hosted by the peer node that hosted the inactivated application, or some other peer node in the network. Advantageously, by routing a network peer node to a redundant application hosted by any appropriate destination peer node that provides a service equivalent to that of the inactivated application, failover is provided. Thus, resiliency is provided, as is a high speed-communication approach embodied in the form of peer-to-peer application message routing.

In another embodiment of the present invention, the tracker receives a notification from the destination peer node that the destination application is inactivated, and transmits in response thereto a confirmation that an update of the routing table has been performed taking into account the inactivation of the destination application. This is advantageous for reliability reasons; if the notification sent to the tracker for some reason would not reach the tracker, the destination node will implicitly be informed thereof in that no confirmation is received, wherein the destination node sends a further notification that the destination application has been inactivated, such that the routing table can be successfully updated.

In an embodiment of the present invention, the routing table is a hash table. This is advantageous, since the table look-up speed becomes high, i.e. the time for mapping a search key to a physical destination address is relatively low.

In a further embodiment of the present invention, the copy of the updated routing table is provided in the form of incremental changes with respect to a latest provided copy of the routing table. Thus, when entering the network a peer node is provided with a snapshot of the routing table stored by the tracker. Whenever an application hosted by a peer node is inactivated, an updated table is provided to the network peer nodes. However, when providing the updated routing table, incremental changes are provided instead of a complete snapshot. This has the advantage that relatively small changes are made when updating the table, i.e. only the entries being affected in the routing table are amended, and only a relatively small number of updated entries need be provided to the network peer nodes.

In another embodiment of the present invention, a network is provided comprising at least two of the trackers described in any one of the previous embodiments. It should be noted that a plurality of trackers could be used in the network for providing failover. One of the trackers used will be the primary tracker for registering the peer nodes in the network and providing the network peer nodes with a current routing table as has been described in detail in the above. One or more further trackers will be used as secondary trackers providing redundancy in case of primary tracker failure. The secondary tracker(s) should thus be provided with a current and up-to-date routing table such that the current routing table, which reflects routing status of the network, resides on the primary tracker as well as on the secondary tracker(s). In case the primary tracker e.g. goes down, a secondary tracker will take the place of the failing primary tracker.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
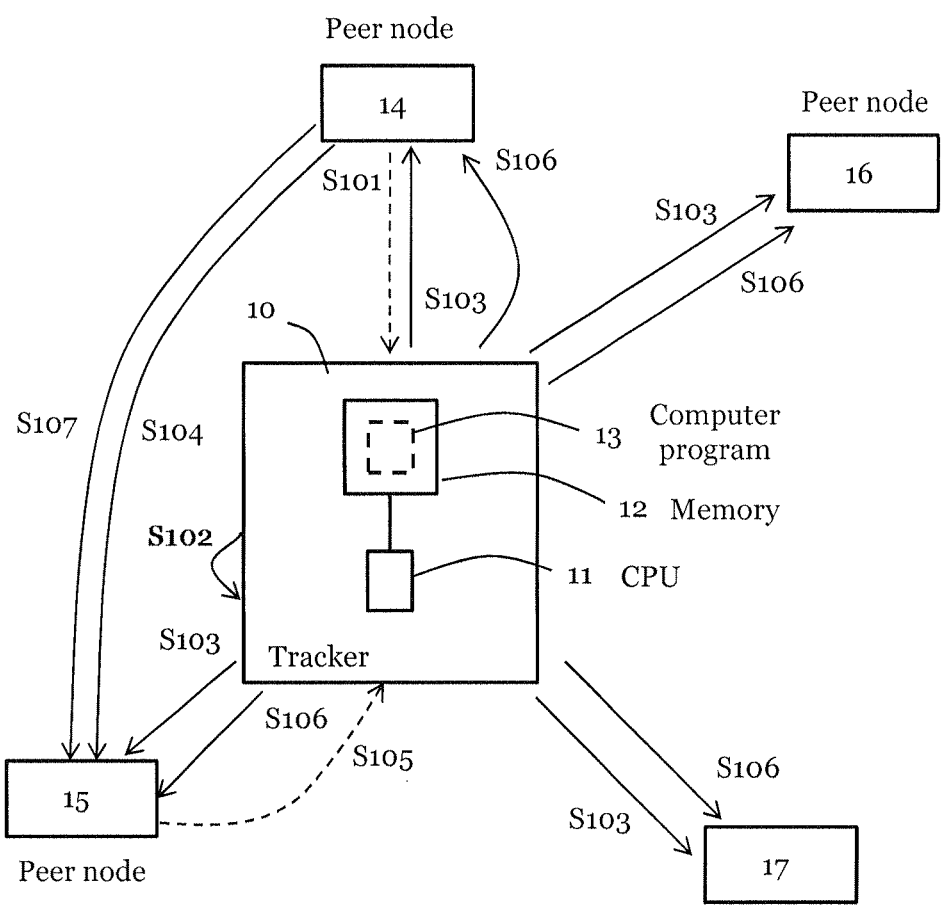
FIG. 1 shows resilient peer-to-peer application message routing in accordance with an embodiment of the present invention.

FIG. 1 shows a device for facilitating resilient peer-to-peer application message routing in accordance with an embodiment of the present invention. The device 10, generally referred to as a tracker, comprises a processing unit 11 and a storage medium 12, i.e. a device having computing and data storing capabilities, such as a server. In practice, the method according to embodiments of the present invention undertaken at the tracker is performed by the processing unit 11 embodied in the form of one or more microprocessors arranged to execute a respective computer program 13 downloaded to the storage medium 12 associated with the microprocessor, such as a Random Access Memory (RAM), a Flash memory or a hard disk drive. The processing unit 11 is arranged to at least partly carry out the method according to embodiments of the present invention when the appropriate computer program 13 comprising computer-executable instructions is downloaded to the storage medium 12 and executed by the processing unit 11. The storage medium 12 may also be a computer program product comprising the computer program 13. Alternatively, the computer program 13 may be transferred to the storage medium 12 by means of a suitable computer program product, such as a floppy disk, a compact disc, or a memory stick. As a further alternative, the computer program 13 may be downloaded to the storage medium 12 over a network. Moreover, the storage medium could be remotely located from the device 10. The processing unit 11 may alternatively be embodied in the form of an application specific integrated circuit (ASIC), a field-programmable gate array (FPGA), a complex programmable logic device (CPLD), etc.

Figure 2:
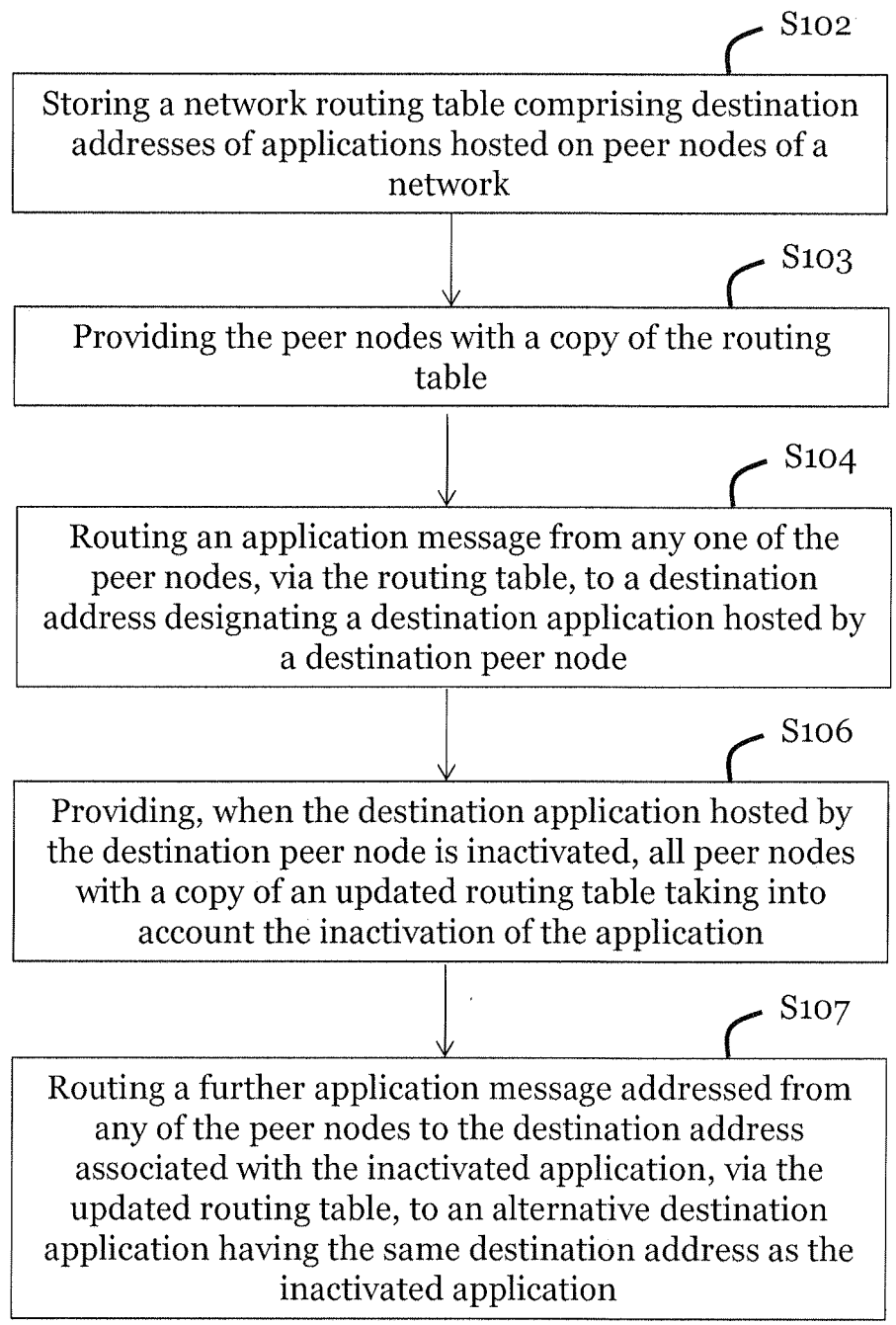
FIG. 2 shows a flowchart of a method of performing resilient peer-to-peer application message routing in accordance with an embodiment of the present invention.

Thus, with reference to FIG. 1, and further to FIG. 2 showing a flowchart of a method according to an embodiment of the present invention, the tracker 10 registers and manages peer nodes 14, 15, 16, 17 included in a network via an appropriate communication interface. Note that FIG. 1 shows a network comprising four peer nodes 14, 15, 16, 17 for exemplifying reasons. In reality, the network could comprise hundreds or even thousands of peer nodes. A peer node wishing to enter the network may e.g. be embodied in the form of a computer client requesting access to a particular destination node running an application which the computer client wishes to execute. The peer node 14 entering the network establishes a connection S101 to the tracker 10, e.g. via the Internet. The tracker stores S102 a network routing table listing routes, i.e. physical addresses, to applications hosted on various network destination peer nodes 15, 16, 17. Thus, an initial network registration request S101 is made via the tracker 10. Upon registration of the peer node 14 entering the network, the tracker 10 provides, in step S103, the entering peer node 14 with a copy of the routing table via which an application message from the entering network peer node 14 subsequently is routed to a destination address designating a destination application hosted by a destination peer node to which the registered node requests access. This has previously been undertaken for the peer nodes 15, 16, 17 that entered the network prior to the entering peer node 14. Further, since the entering peer node 14 affects the structure of the network, the routing table—and the distributed copies of the routing table—will take into account possible applications (and their physical addresses in the network) hosted on the peer node 14. Hence, all network peer nodes 14, 15, 16, 17 will be provided with a copy of this routing table which takes into account the changes in the network brought about by the entry of peer node 14.

Assuming e.g. that the entering node 14 requests access to a destination application hosted by peer node 15, i.e. peer node 15 is a destination peer node in this particular example, an application message is routed in step S104, via the copy of the routing table, from the entering peer node 14 to a destination address designating the destination application hosted by the destination peer node 15.

Practically, the routing table could comprise an association such as:

"order matching"→0x00011001

Thus, an operator at the computer embodied by the entering peer node 14, may type search key "order matching", which term is translated into an associated physical address wherein an appropriate application message is sent to physical address 0x00011001, which designates the "order matching" destination application, which in this particular example is hosted on the destination peer node 15. The destination peer node could optionally reply to the application message with required data regarding securities trade order matching in line with instructions provided in the received application message. By having the entering network peer node 14 locally store a replicated routing table, access time to the destination peer node 15 hosting the required application can be dramatically reduced since the destination application of the destination peer node 15 does not have to be accessed via the tracker 10, but can be directly addressed via the locally stored copy of the routing table in a peer-to-peer manner.

Now, assuming that the destination application hosted by the destination peer node 15 becomes inactive, due to e.g. a software crash on the destination peer node 15, or that the destination peer node 15 on which the application is hosted exits the network, this inactivation of the application will be registered by the tracker, for instance by the destination peer node 15 notifying the tracker 10 of the inactivation in step S105. As a result thereof, the tracker 10 provides the network peer nodes in step S106 with a copy of an updated routing table taking into account that the application has been inactivated. The application entry could either be cancelled altogether from the routing table, i.e. the entry associated with the application is nullified, or the entry remains in the table with an indication that it no longer is valid.

When a peer node registers one or more applications with the tracker, redundant applications could be registered in the network. In line with the previous example, a peer node may register more than one "order matching" application with the tracker. This could be handled in the routing table as:

1. "order matching"→0x00011001
2. "order matching"→0x00011010

Thus, one of the two identical "order matching" application will be given precedence before the other; item 1 in the routing table will be executed until it becomes inactivated. As soon as the first mentioned application is inactivated, the "order matching" application of item 2 will take the place of the inactivated application.

It should be noted that different peer nodes may register identical applications. In such a case, registering of the applications is generally undertaken on a first come, first serve basis.

A further application message addressed from the entering peer node 14, or any other of the peer nodes, to the destination address associated with the inactivated application is routed in step S107, via the updated and locally stored routing table, to an alternative destination application having the same destination address as the inactivated application. In this exemplifying embodiment, the alternative destination application is hosted by the destination peer node 15 that hosted the inactivated application, but the alternative destination application could in another exemplifying embodiment be hosted by some other peer node in the network. Advantageously, by routing the application message of a network peer node to a redundant application hosted by any appropriate destination peer node that provides a service equivalent to that of the inactivated application, failover is provided.

Thus, resiliency is provided, as is a high speed-communication approach embodied in the form of peer-to-peer application message routing.

Figure 3:
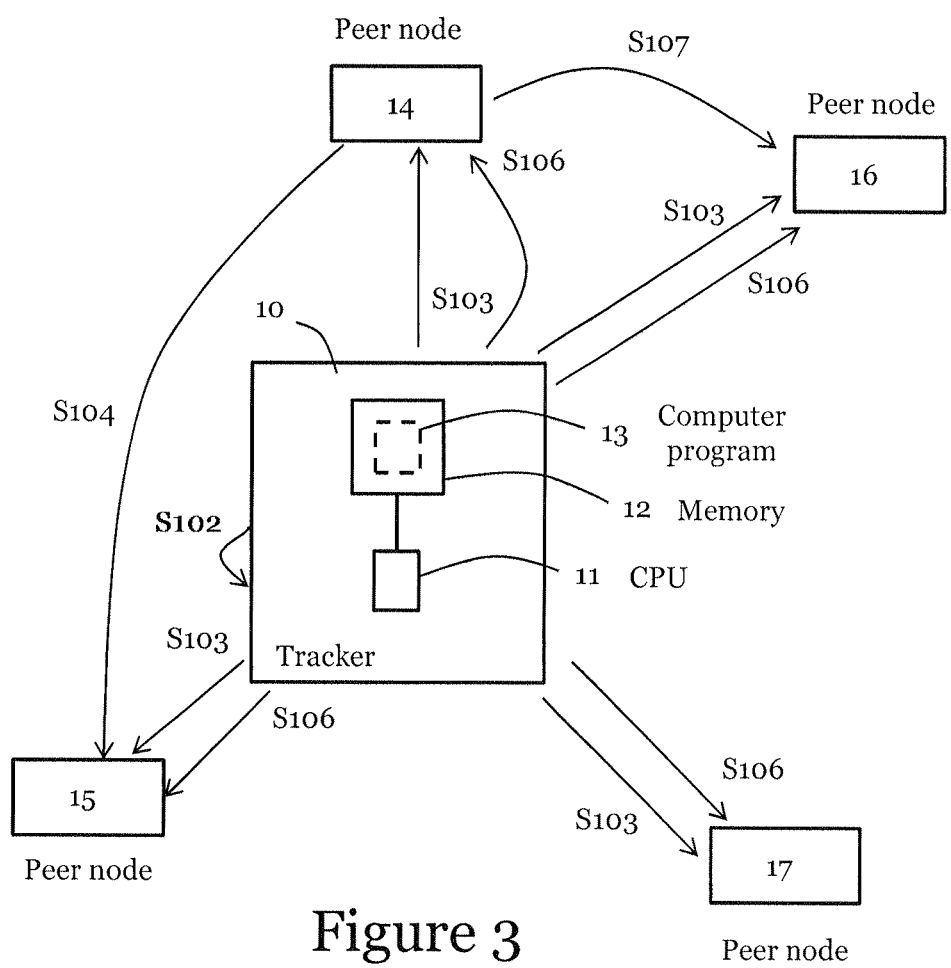
FIG. 3 shows resilient peer-to-peer application message routing in accordance with a further embodiment of the present invention.

FIG. 3 shows a further exemplifying embodiment of the present invention where the entering peer 14 is routed to an alternative application message hosted by an alternative destination node 16. Again, the tracker 10 stores S102 a network routing table listing routes to applications hosted on various network destination peer nodes 15, 16, 17, a copy of which is distributed to all the peer nodes 14, 15, 16, 17 in step S103. The entering node 14 requests access to a destination application hosted by the destination peer node 15, wherein an application message is routed in step S104, via the copy of the routing table, from the entering peer node 14 to a destination address designating the destination application hosted by the destination peer node 15, as previously was discussed in more detail with reference to FIG. 1. The destination node 15 responds to the request in an appropriate manner, e.g. by returning a requested piece of information. The destination application hosted by the destination peer node 15 becomes inactive, wherein the tracker 10 provides the network peer nodes in step S106 with a copy of an updated routing table taking into account that the application has been inactivated. A further application message addressed from the entering peer node 14, or any other of the peer nodes, to the destination address associated with the inactivated application is routed in step S107, via the updated and locally stored routing table, to an alternative destination application having the same destination address as the inactivated application. In this exemplifying embodiment, the alternative destination application is hosted by a destination peer node 16 different from the peer node 15 hosting the inactivated application. If a peer node hosting a destination application exits the network, a request to an alternative destination application would inevitably have to be directed to a peer node different from that hosting the inactivated destination application.

Figure 4:
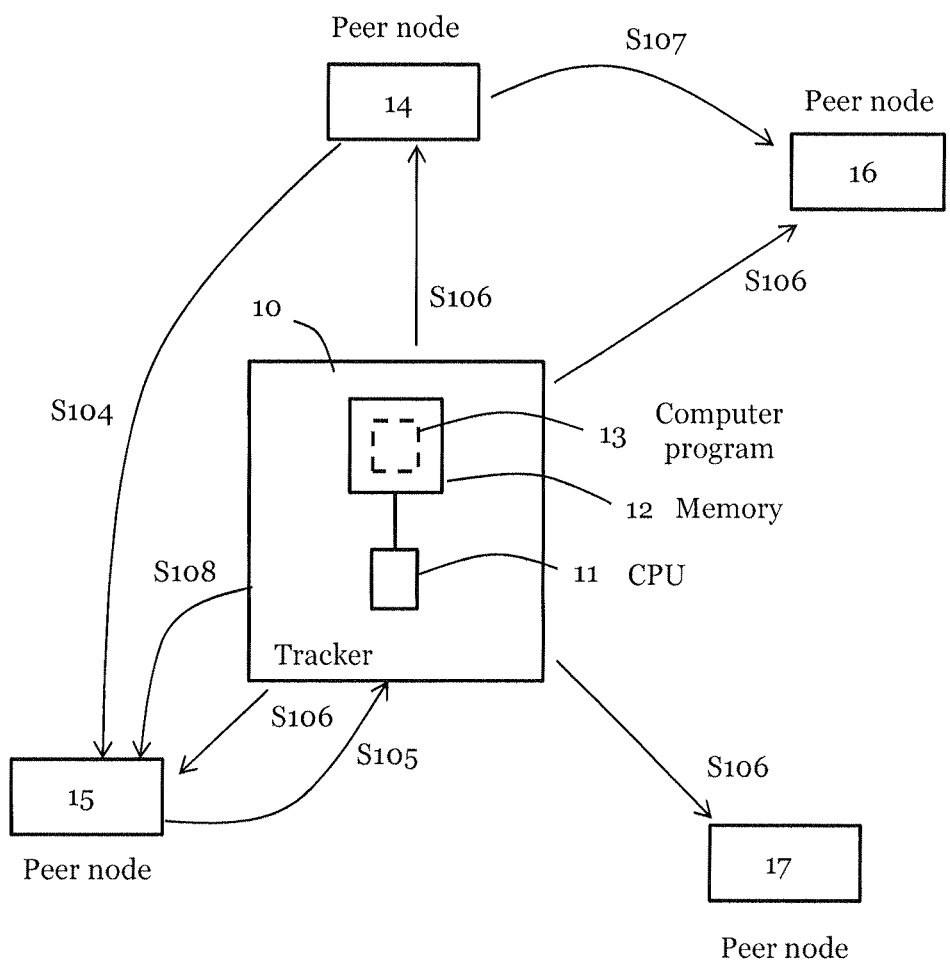
FIG. 4 shows resilient peer-to-peer application message routing in accordance with yet a further embodiment of the present invention.

FIG. 4 shows yet a further exemplifying embodiment of the present invention where a confirmation is sent from the tracker 10 to the destination peer node 15 that an update of the routing table successfully has been made. The network peer nodes 14, 15, 16, 17 has in this exemplifying embodiment been supplied with a copy of the network routing table stored on the tracker 10, which comprises routing information to applications hosted on the peer nodes. An information querying peer node 14 requests access to a destination application hosted by the destination peer node 15, wherein an application message is routed in step S104, via the copy of the routing table, from the querying peer node 14 to a destination address designating the destination application hosted by the destination peer node 15, as previously has been discussed in more detail, and receives information in response thereto appropriately. The destination application hosted by the destination peer node 15 becomes inactive, which is indicated to the tracker 10. Thus, the tracker 10 receives in step S105 a notification from the destination peer node 15 that the destination application is inactivated. In this particular exemplifying embodiment, as a precautionary measure, the tracker 10 transmits S108 in response thereto a confirmation that an update of the routing table has been performed taking into account the inactivation of the destination application. This is advantageous, since if the notification sent to the tracker 10 in step S105 for some reason would not reach the tracker, the destination node 15 will implicitly be informed thereof in that no confirmation is received, wherein the destination node 15 sends a further notification that the destination application has been inactivated, such that the routing table can be successfully updated. As in the embodiment described with reference to FIG. 3, the tracker 10 proceeds by providing the network peer nodes in step S106 with a copy of an updated routing table taking into account that the application has been inactivated as indicated in step S105. A further application message addressed from the querying peer node 14, or any other of the peer nodes, to the destination address associated with the inactivated application is routed in step S107, via the updated and locally stored routing table, to an alternative destination application having the same destination address as the inactivated application hosted by a new destination peer node 17. It should be noted that in case the querying peer node 14 would make a further access to the destination application hosted by the destination peer node 15 after the destination application has been inactivated but before a copy of an updated table taking the inactivation into account has been submitted to all network peer nodes 14, 15, 16, 17, the destination peer node 15 can optionally send the querying peer node 14 a notification that no success full update of the routing tale has been undertaken, such that the querying peer node 14 awaits the copy of the successfully update routing table in order to correctly address an alternative destination application, in this particular exemplifying embodiment hosted by the alternative destination node 16.

Figure 5:
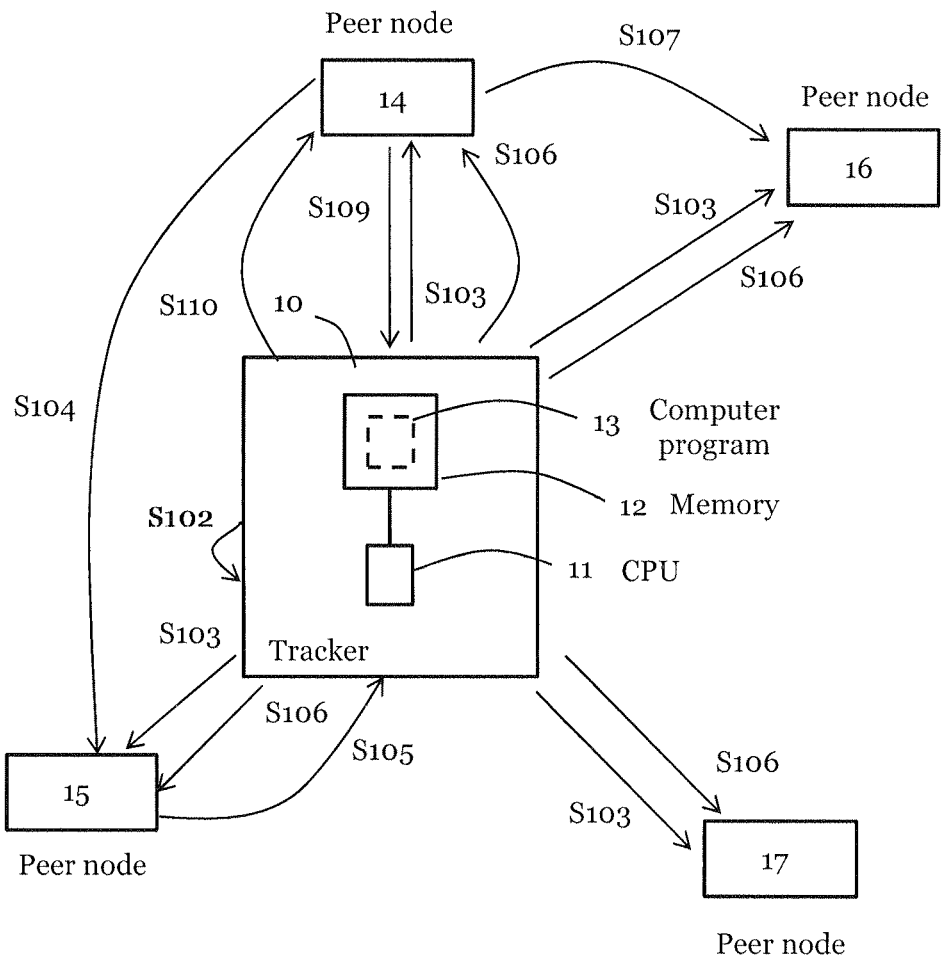
FIG. 5 shows resilient peer-to-peer application message routing in accordance with another embodiment of the present invention.

FIG. 5 shows a further exemplifying embodiment of the present invention where versioning of the routing table is applied. In this particular exemplifying embodiment, the routing table is stored S102 at the tracker 10 along with a version number reflecting a current version of the routing table. The network peer nodes 14, 15, 16, 17 are supplied S103 with a copy of the network routing table stored on the tracker 10 along with the current version number. An information querying peer node 14 requests access to a destination application hosted by the destination peer node 15, wherein an application message is routed in step S104, via the copy of the routing table, from the querying peer node 14 to a destination address designating the destination application hosted by the destination peer node 15, and receives information in response thereto appropriately. The destination application hosted by the destination peer node 15 becomes inactive, which is indicated to the tracker 10 in step S105. The tracker 10 proceeds by providing the network peer nodes in step S106 with a copy of an updated routing table taking into account that the application has been inactivated, which copy in this particular embodiment further comprises the current version number of the routing table. As in previous embodiments, A further application message addressed from the querying peer node 14, or any other of the peer nodes, to the destination address associated with the inactivated application is routed in step S107, via the updated and locally stored routing table, to an alternative destination application having the same destination address as the inactivated application hosted by a new destination peer node 17.

In this particular exemplifying embodiment, the routing table is provided with a version number for safety reasons in case the copy of the updated routing table sent to each peer node 14, 15, 16, 17 for some reason would not reach one or more of the peer nodes. Further, the version number could be included in the application messages sent between the different peer nodes, and if there is a mismatch in version numbers between that included in the application message and that associated with the copy of the routing table locally stored at the peer node receiving the application message, the one of the two communicating peer nodes having the lowest version number, i.e. the peer node having access to a copy of a routing table not being up to date, will turn to the tracker 10 for a copy of the most recent routing table. Thus, assuming that exchange of data in step S104 between the querying peer node 14 and the destination peer node 15 would result in a conclusion that the querying peer node 14 has a copy of the routing table with version number 12, while the copy of the routing table stored at the destination peer node 15 has version number 13, the querying peer node 14 sends S109 a request to the tracker to receive a copy of the routing table having the most recent version number. The tracker 10 responds by transmitting S110, in response to the request, a copy of the routing table having the most recent version number to the querying peer node 14.

Figure 6:
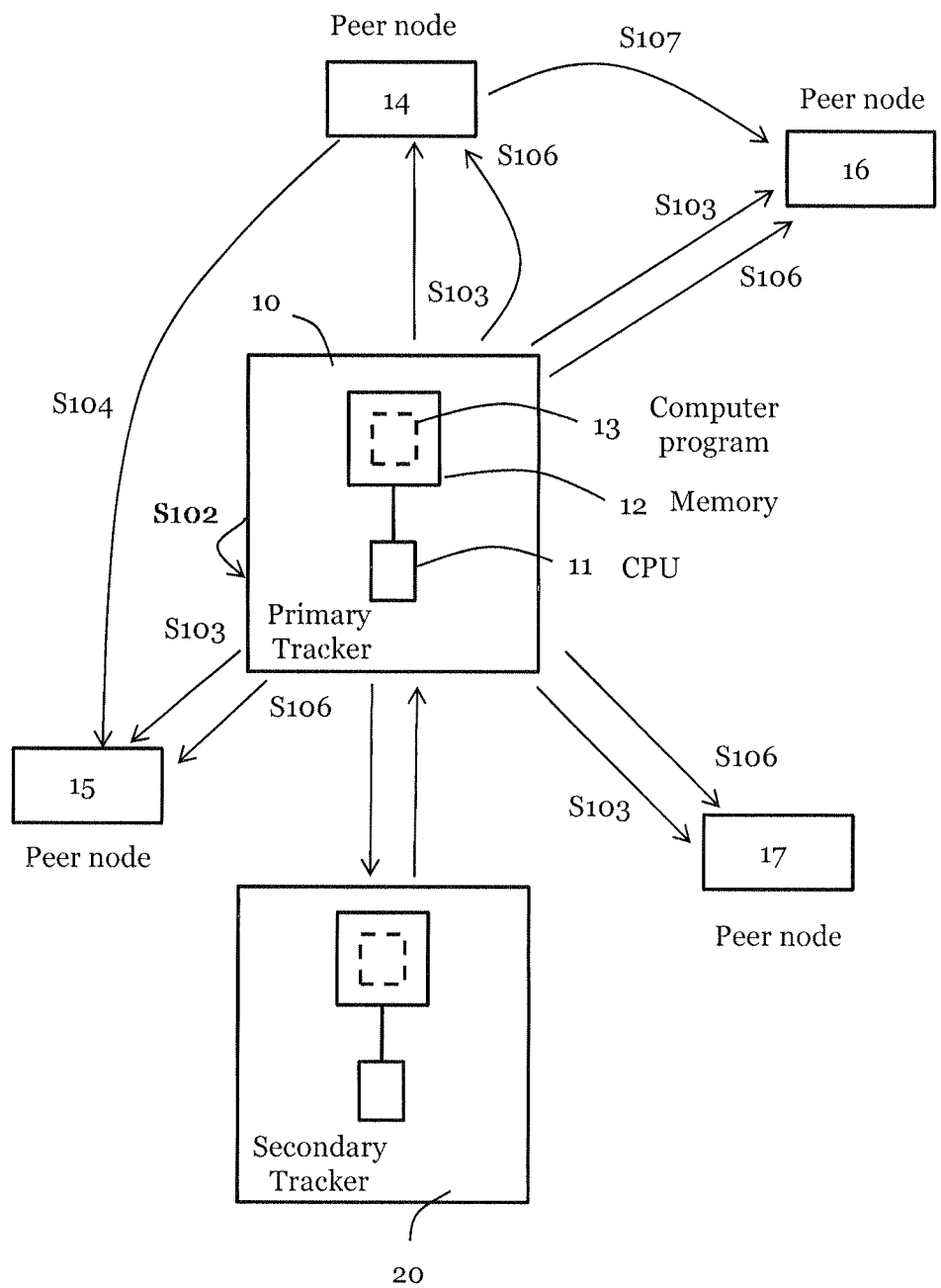
FIG. 6 shows resilient peer-to-peer application message routing in accordance with still another embodiment of the present invention.

FIG. 6 illustrates yet a further embodiment of the present invention, in which a network is provided comprising at least two of the trackers described in the previous embodiments. The steps S102, S103, S104, S106, S107 has previously been described with reference to FIG. 3. However, FIG. 6 illustrates the utilization of a plurality of trackers 10, 20 in the network for providing failover. One of the trackers 10 will be the primary tracker for registering the peer nodes 14, 15, 16, 17 in the network and providing the network peer nodes with a copy of a routing table as has been described in detail in the above. One or more further trackers will be used as secondary tracker(s) 20 providing redundancy in case of primary tracker 10 failure. The secondary tracker 20 should thus be provided with a current and up-to-date routing table such that the current routing table, which reflects routing status of the network, resides on the primary tracker 10 as well as on the secondary tracker 20. In case the primary tracker 10 shuts down and/or is removed from the network, either by intentional shutdown due to e.g. servicing or software updating or by unintentional shutdown due to e.g. failure, a secondary tracker 20 will take the place of the failing primary tracker.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A computer-implemented method of performing resilient peer-to-peer application message routing, comprising the steps of:

storing, in a memory, a network routing table comprising destination addresses of destination applications hosted on peer nodes of a network;

registering, by a data processing circuitry including a primary tracker node, a first destination application and a second destination application, where the first destination application is the same as the second destination application and both the first destination application and the second destination application have the same destination address;

providing, by the data processing circuitry including the primary tracker node, the peer nodes and a secondary tracker node with a copy of the routing table, via which routing table, an application message from a query one of the peer nodes is routed to a destination address designating a destination application hosted by a destination peer node;

providing, by the data processing circuitry including the primary tracker node, when the first destination application hosted by the destination peer node is inactivated, all of the peer nodes and the secondary tracker node with a copy of an updated routing table indicating the inactivation of the first destination application and routing of the application message to the second destination application, wherein a further application message addressed from any of the peer nodes to the destination address associated with the inactivated application is routed, via the updated routing table, to the second destination application having the same destination address as the inactivated application, and wherein the secondary tracker node, in case of failure of the primary tracker node, performs the providing steps for the primary tracker node including, in response to a request from the querying peer node for a copy of the updated routing table having a most recent version number, providing a copy of the updated routing table having the most recent version number to the querying peer node.

2. The method of claim 1, wherein the alternative destination application is hosted on the destination peer node which hosted the inactivated application.

3. The method of claim 1, wherein the alternative destination application is hosted on a peer node different from the peer node which hosted the inactivated application.

4. The method of claim 1, further comprising:
receiving a notification from one of the primary and secondary tracker nodes that the destination application is inactivated; and
transmitting in response thereto a confirmation that an update of the routing table has been performed taking into account the inactivation of the destination application.

5. A system for facilitating resilient peer-to-peer application message routing, the device comprising:
a storage medium configured to store a network routing table comprising destination addresses of destination applications hosted on peer nodes of a network;
a processor including a primary tracker configured to:

register a first destination application and a second destination application, where the first destination application is the same as the second destination application and both the first destination application and the second destination application have the same destination address; and provide the peer nodes and a secondary tracker with a copy of the routing table via which routing table an application message from a querying one of the peer nodes is routed to a destination address designating a destination application of a destination peer node, provide, when the destination application hosted by the destination peer node is inactivated, all peer nodes and the secondary tracker with a copy of an updated routing table indicating the inactivation of the first destination application and routing of the application message to the second destination application, wherein a further application message addressed from any of the peer nodes to the destination address associated with the inactivated application is routed, via the updated routing table, to an alternative destination application having the same destination address as the inactivated application, and wherein the secondary tracker is configured to provide the copy of the routing table and provide the copy of the updated routing table in case of failure of the primary tracker node including, in response to a request from the querying peer node for a copy of the updated routing table having a most recent version number, to provide a copy of the updated routing table having the most recent version number to the querying peer node.

6. The system of claim 5, wherein the alternative destination application is hosted on the destination peer node which hosted the inactivated application.

7. The system of claim 5, wherein the alternative destination application is hosted on a peer node different from the peer node which hosted the inactivated application.

8. The system of claim 5, wherein the processor is further configured to:
receive a notification from the destination peer node that the destination application is inactivated; and
transmit, in response thereto, a confirmation that an update of the routing table has been performed taking into account the inactivation of the destination application.

9. The system of claim 5, wherein the routing table is a hash table.

10. The system of claim 5, wherein the processor is further configured to provide the copy of the updated routing table in the form of incremental changes with respect to a latest provided copy of the routing table.

11. The system of claim 5, wherein the processor is further configured to provide the copy of the routing table to the peer nodes of the network for local storage at the respective peer node.

12. A non-transitory, computer-readable medium comprising a computer program which when executed on a computer causes a device to perform the steps recited in claim 1.

* * * * *